United States Patent [19]

McCoy et al.

[11] Patent Number: 4,862,146
[45] Date of Patent: Aug. 29, 1989

[54] DETECTION APPARATUS

[75] Inventors: Kenneth McCoy; Neil Edwards, both of Redwood City; Robert Wasley, San Carlos; Denis Wales, Fremont, all of Calif.

[73] Assignee: Raychem Corporation, Menlo Park, Calif.

[21] Appl. No.: 31,481

[22] Filed: Mar. 27, 1987

[51] Int. Cl.$^4$ .............................................. G08B 21/00
[52] U.S. Cl. .................................. 340/605; 174/11 R
[58] Field of Search ...................... 340/603, 604, 605; 174/11 R, 112; 324/555

[56] References Cited

U.S. PATENT DOCUMENTS 3,098,116 7/1963 Jore et al. ........................... 340/604
4,029,889 6/1977 Mizuochi .......................... 174/11 R

FOREIGN PATENT DOCUMENTS 0144211 6/1985 European Pat. Off. .
3419705 11/1985 Fed. Rep. of Germany .... 174/11 R
107251 4/1943 Sweden ............................ 174/11 R
1355176 6/1974 United Kingdom .

Primary Examiner—Joseph A. Orsino
Assistant Examiner—Jeffery A. Hofsass
Attorney, Agent, or Firm—Timothy H. P. Richardson; Herbert G. Burkard

[57] ABSTRACT

An apparatus for detecting the occurrence of an event, e.g. the presence of a liquid leak. The apparatus includes an elongate flexible core consisting of elongate elements which are twisted together. The elongate elements comprise first and second sensing members, which each have an electrically conductive outer surface and are physically separated from one another, and at least two elongate insulating members. These elongate elements are covered by a flexible braid which exerts a compressive force on the core. In one aspect of the invention, the flexible braid undergoes a reversible change in appearance when exposed to electrolyte, indicating the location of a leak.

19 Claims, 2 Drawing Sheets

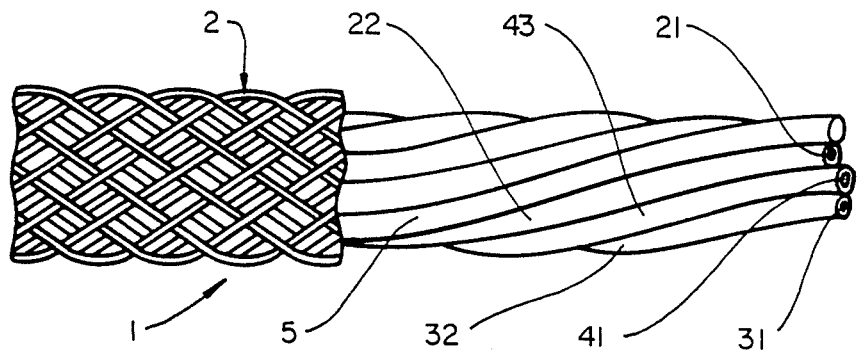
FIG_1
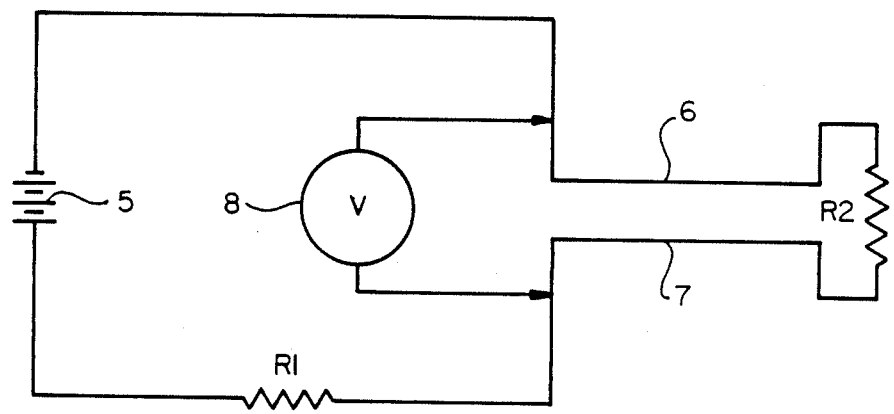
FIG_2

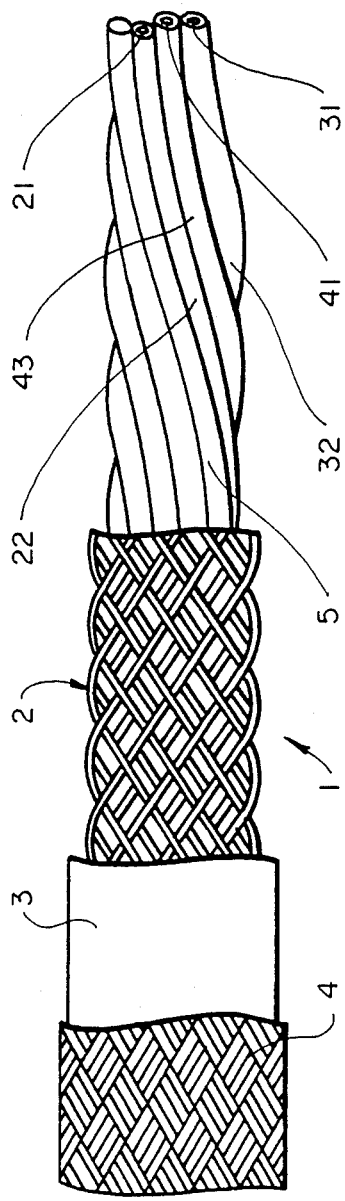
FIG_3

DETECTION APPARATUS

BACKGROUND OF THE INVENTION

1. Field of the Invention

This invention relates to apparatus for use in the detection of changes in variables, e.g. liquid leaks.

2. Introduction to the Invention

A number of methods have been used (or proposed for use) to detect changes in variables at a point or points or along an elongate path, or on a surface, or in a zone, e.g. the occurrence of a leak (of water or another liquid or gas), insufficient or excessive pressure, too high or too low a temperature, the presence or absence of light or another form of electro-magnetic radiation, or a change in the physical position of a movable member, e.g. a valve in a chemical process plant or a window in a building fitted with a burglar alarm system. Changes of this kind are referred to in this specification by the generic term "event". Reference may be made for example to U.S. Pat. Nos. 1,084,910, 2,581,213, 3,248,646, 3,384,493, 3,470,340, 3,800,216, 3,991,413, 4,278,931 and 4,400,996, U.K. Pat. Nos. 1,481,850, 1,355,176 and 182,339, German Offenlegungschriften Nos. 3,001,150.0 and 3,225,742, and copending, commonly assigned, U.S. patent applications Ser. Nos. 691,291 (now abandoned), 831,758 (now abandoned) in favor of continuation-in-part application Ser. No. 017,375), 832,562, 838,725, and 856,925 (now abandoned). The disclosures of each of the patents, applications and other publications referred to above are incorporated herein by reference.

SUMMARY OF THE INVENTION

We have now discovered new apparatus for detecting the occurrence of an event, in particular the presence of a liquid, especially an electrolyte or a hydrocarbon, which can be used in a wide variety of situations.

In its first aspect, the invention provides a flexible sensor cable comprising
  (1) an elongate flexible core which consists essentially of a plurality of flexible elongate elements which are interlaced together, preferably twisted together, said elongate elements comprising:
    (a) a first elongate sensing member which (i) comprises a first metal wire, and (ii) has an outer surface which is electrically conducting and is electrically connected to or forms a part of the first metal wire,
    (b) a second elongate sensing member which (i) comprises a metal wire, and (ii) has an outer surface which is electrically conducting and is electrically connected to or forms a part of the second metal wire, the second sensing member being spaced apart from the first sensing member at each point along the sensor cable, and
    (c) a plurality of elongate insulating members; and
  (2) an elongate, flexible braid which is composed of elongate flexible insulating members, and which surrounds and exerts a compressive force on the core.

In its second aspect, the invention provides a sensor which comprises
  (1) a core which comprises first and second sensing members which are insulated from each other in the absence of electrolyte but which become electrically connected to each other if they are exposed to electrolyte, and
  (2) an outer member which surrounds the core, which is previous to electrolyte, and which undergoes a reversible change in appearance when exposed to electrolyte.

BRIEF DESCRIPTION OF THE DRAWING

The invention is illustrated by the accompanying drawing, in which

FIG. 1 is a plan view of one embodiment of the sensor cable, and

FIG. 2 is a circuit diagram of a monitoring circuit for use in the present invention.

FIG. 3 is a plan view of another embodiment of the sensor cable.

DETAILED DESCRIPTION

The novel sensor cables of the first aspect of the invention have distinct advantages over known sensor cables, for example one or more of the following advantages:
  (1) improved flexibility in three dimensions, as compared for example to sensor cables in which elongate elements are secured to a tape;
  (2) more rapid and more economical manufacture, as compared for example to sensor cables in which the sensing members and other elongate elements are braided around a central core; and
  (3) uniformity of response along the length of the cable, since the twisted configuration of the core elements ensures that the sensing members are alternately at the bottom of the cable, thus avoiding the possibility that a large but shallow pool of electrolyte will not electrically connect the sensing members.

When the braid which surrounds the core provides the outer surface of the cable, it is permeable to liquids but ensures that, when the sensor cable is placed on a conducting surface, neither of the sensing members becomes electrically connected to that surface. The braid exerts a compressive force on the core and thus helps to maintain the sensing members at a constant distance from each other even when the cable is bent. The compressive force required depends upon the inherent stability of the core configuration; for example the lower the degree of interlacing, e.g. the number of turns per unit length in a twisted core, the more important it is that the braid should exert a compressive force on the core.

The elongate elements of the core are preferably round in cross-section, but can be shaped so as to improve the stability of the core configuration. The sensing members, which can be different from each other but are preferably the same, can be bare wires or partially insulated wires, but preferably each comprises a metal wire and, electrically surrounding the wire (i.e. providing the only path for electrical contact between the wire and the exposed surface of the sensing member), a coating of a conductive polymer composition which provides at least part of the exposed surface of the sensing member. The elongate insulating members in the core, which can be the same or different, can consist of insulating material, e.g. be a monofilament or a yarn of an organic polymer or glass, or can comprise an insulated metal wire. When at least one of the core insulating members is an insulated wire, the cable can be used not only to detect but also to locate the presence of an electrolyte, e.g. by the systems disclosed in the copending commonly assigned applications incorporated herein by reference.

It is desirable, in the interests of speed and ease of manufacturing, that the number of elongate elements in the core should be as small as possible. We have found that if at least two of the insulating members have a substantially larger diameter than the sensing members, this provides a more stable configuration. Thus if each of the sensing members has a first diameter, $d_1$, and at least two, preferably all, of the insulating members have a second diameter, $d_2$, the ratio $d_2/d_1$ is preferably at least 1.2:1, e.g. 1.2:1 to 2.0:1, particularly 1.3:1 to 1.7:1, especially about 1.5:1. The first diameter, $d_1$, may be for example from 0.02 to 0.1 inch, preferably 0.03 to 0.05 inch, and the second diameter, $d_2$, may be for example from 0.03 to 0.2 inch, preferably 0.05 to 0.08 inch. Particularly preferred sensor cables comprise a core which consists essentially of the two sensing members and two larger diameter insulating members twisted together. The amount of twist placed on the core should be sufficient, together with the compressive force exerted by the braid, to ensure adequate stability, preferably such that the distance between the sensing members is the same at each point along the length of the cable and is substantially unchanged by bending the cable. With the preferred core which consists of two insulating members and two sensing members, we have obtained good results with twists in the range of 3 to 15 twists per foot. If necessary, small changes in the twist level provide a convenient means of accommodating small changes in the resistance per foot of one or more of the wires in the elongate members when the sensor cable is to form part of a system for locating an event, in which case it is important that the finished cable has a fixed and known resistance per foot.

The sensor cable can consist essentially of the twisted core and the braid around it, and such a cable is normally one which is designed to detect the presence of an electrolyte which electrically connects the sensing members. In another embodiment, the sensor cable is designed to detect the presence of one or more designated liquids, particularly hydrocarbons, the braid is surrounded by a layer of a conductive polymer which swells when exposed to one of those liquids, and the layer of conductive polymer is surrounded by a restraining member which is pervious to the liquids, e.g. a braid, so that when the sensor cable is exposed to one of the liquids, the layer of conductive polymer swells through the braid between it and the twisted core, thus contacting and connecting the two sensing members. In this embodiment, the braid surrounding the twisted core is in itself pervious to liquids (since its openings are large enough to permit the conductive polymer to swell through it), but the layer of conducting polymer prevents access to the braid. The invention also includes other sensor cables which combine the features and advantages of the present invention with the characteristics of sensor cables disclosed in the documents incorporated by reference herein.

In its second aspect, the invention is concerned with providing a sensor with an outer member which undergoes a reversible change in appearance when exposed to water or another electrolyte. This characteristic is not of course needed in sensors which form part of a system which not only detects but also locates an event. However, it is very useful in low cost systems in which connection of the sensor members by an electrolyte provides an alarm or other indication of a leak, but no more, and in which the sensor cable can then be visually inspected to locate the leak. It is particularly but not exclusively useful in sensor cables according to the first aspect of the invention, in which case the outer member is the braid surrounding the core. The outer member preferably comprises clear filaments which are composed of an organic polymer (e.g. polypropylene) and whose reflectance is changed by contact with water. The sensor core is preferably colored, particularly black, so that the change in appearance of the sensor is more apparent.

DETAILED DESCRIPTION OF THE DRAWING

Referring now to FIG. 1, this illustrates a sensor cable according to both the first aspect and the second aspect of the invention. The sensor cable comprises a core 1 which is composed of four elongate flexible elements which are twisted together, namely a first elongate sensing member comprising a metal core 21 surrounded by a conductive polymer coating 22, a second elongate sensing member comprising a metal core 31 surrounded by a conductive polymer coating 32, a first elongate insulating member comprising a metal core 41 surrounded by an insulating organic polymer jacket 43, and a second insulating member 5 composed of an insulating organic polymer. The outer diameters of the sensing members are the same as each other. The outer diameters of the insulating members are the same as each other and about 1.5 times the outer diameter of the sensing member. The twisted core is surrounded by a flexible braid 2 which is composed of clear filaments of an organic polymer.

Referring now to FIG. 2, this shows the electrical circuit of a detection system which incorporates a sensor cable according to the first aspect of the invention. The near ends of two sensing members 6 and 7 are connected to a battery 5 through a resistor $R_1$, and the far ends are connected to each other through a continuity resistor $R_2$. The voltage drop across the near ends of the sensing members is monitored by a voltmeter 8 which indicates when presence of an electrolyte causes the sensing members to become electrically connected.

Referring now to FIG. 3, this illustrates a sensor cable of the invention which is suitable for detecting the presence of hydrocarbons. The cable comprises a core 1 and a braid 2 as in FIG. 1, and in addition a layer 3 which surrounds the braid 2 and is composed of a conductive polymer which swells when contacted by a hydrocarbon, and a restraining member 4 which surrounds the layer 3 and is composed of glass fibers.

The invention is further illustrated by the following Example.

EXAMPLE

Two elongate sensing members were prepared by extruding a conductive blend of polyvinylidene fluoride and carbon black over 24AWG conductor to form a conductive polymer coating having a wall thickness of 0.010 inch and an outer diameter of 0.043 inch. Two elongate insulating members were prepared by extruding polyethylene containing sufficient carbon black to render it black but nonconductive into 0.065 inch diameter filaments. These four elongate members were twisted together (about 6 to 8 turns per foot) to form a twisted core as shown in FIG. 1, i.e. with the insulating members adjacent to one another and the sensing members positioned on the top and bottom of the junction of the insulating members. The twisted core was then covered with a braid composed of 0.015 inch diameter clear polypropylene monofilaments. The braided surface of the dry product appeared to be shiny gray. When the product was exposed to water, the surface appeared to be black, indicating the position of the moisture.

We claim:

1. A flexible sensor cable comprising
   (1) an elongate flexible core which consists of four separable flexible elongate elements which are twisted together, the center of each of said elongate elements following a twisted path which is different from the twisted path followed by the center of any of the other elongate elements, said elongate elements comprising
      (a) a first elongate sensing member which (i) comprises a first metal wire, and (ii) has an outer surface which is electrically conducting at each point along the sensor cable and is electrically connected to or forms a part of the first metal wire,
      (b) a second elongate sensing member which (i) comprises a metal wire, and (ii) has an outer surface which is electrically conducting at each point along the sensor cable and is electrically connected to or forms a part of the second metal wire, the second sensing member being spaced apart from the first sensing member at each point along the sensor cable, and
      (c) at least two elongate insulating members; each of the sensing members having a round cross-section having a first diameter, and at least one of the insulating members having a round cross-section having a second diameter which is greater than the first diameter; and
   (2) an elongate, flexible braid which has apertures therein, which is composed of elongate flexible insulating members, and which surrounds and exerts a compressive force on the core.

2. A cable according to claim 1 wherein each of the sensing members consists of a metal wire and, electrically surrounding the wire, a coating of a conductive polymer composition which provides the whole of the outer surface of the sensing member.

3. A cable according to claim 2 wherein the ratio of the second diameter to the first diameter is at least 1.2:1.

4. A cable according to claim 2 wherein the ratio of the second diameter to the first diameter is 1.2:1 to 1.7:1.

5. A cable according to claim 2 wherein the ratio of the second diameter to the first diameter is 1.3:1 to 1.7:1.

6. A cable according to claim 1 wherein the distance between the first and second sensing members is the same at each point along the length of the cable and is substantially unchanged by bending the cable.

7. A cable according to claim 1 wherein at least one of the elongate insulating members in the core comprises an insulated metal wire.

8. A cable according to claim 1 wherein the braid comprises elongate insulating members whose optical properties change when the braid becomes wet, so that when a part of the cable becomes wet and the rest of the cable remains dry, there is a visible change in the appearance of that part of the cable which is wet.

9. A cable according to claim 8 wherein the braid consists of said elongate insulating members whose optical properties change when the braid becomes wet.

10. A cable according to claim 8 wherein the braid consists essentially of clear polypropylene filaments.

11. A cable according to claim 8 wherein at least some of the elongate elements in the core are black.

12. A cable according to claim 8 wherein the change in optical properties is reversible.

13. A cable according to claim 1 which consists of the core and the braid.

14. A cable according to claim 1 wherein the braid is surrounded by a layer of a swellable conductive polymer and said layer is surrounded by a restraining member, whereby swelling of the conductive polymer causes it to swell through the braid and electrically connect the sensing members.

15. A sensor which comprises
   (1) a core which comprises first and second sensing members which are insulated from each other in the absence of electrolyte but which become electrically connected to each other if they are exposed to electrolyte, and
   (2) an outer member which surrounds the core, which is pervious to electrolyte, and which undergoes a reversible change in appearance when exposed to electrolyte.

16. A sensor according to claim 15 which is in the form of a flexible, elongate sensor cable and wherein the core comprises flexible, elongate first and second sensing members, and the outer member is an elongate flexible braid of elongate insulating members.

17. A sensor according to claim 16 wherein the braid comprises clear filaments of an organic polymer and at least part of the core is black in color.

18. A sensor according to claim 17 wherein the filaments are composed of polypropylene.

19. Apparatus for detecting the presence of an electrolyte which comprises
   (A) a flexible sensor cable comprising
      (1) an elongate flexible core which consists of four separable flexible elongate elements which are twisted together, the center of each of said elongate elements following a twisted path which is different from the twisted path followed by the center of any of the other elongate elements, said elongate elements comprising:
         (a) a first elongate sensing member which (i) comprises a first metal wire, and (ii) has an outer surface which is electrically conducting at each point along the sensor cable and is electrically connected to or forms a part of the first metal wire,
         (b) a second elongate sensing member which (i) comprises a metal wire, and (ii) has an outer surface which is electrically conducting at each point along the sensor cable and is electrically connected to or forms a part of the second metal wire, the second sensing member being spaced apart from the first sensing member at each point along the sensor cable, and
         (c) at least two elongate insulating members; and each of the sensing members having a round crosssection having a first diameter, and at least one of the insulating members having a round crosssection having a second diameter which is greater than the first diameter; and
      (2) an elongate, flexible braid which has apertures therein, which is composed of elongate flexible insulating members, and which surrounds and exerts a compressive force on the core;
   (B) a source of electrical power connected to the first and second sensing members, and
   (C) means for indicating when an electrical connection is made between the first and second sensing members of the sensor cable.

* * * * *